(12) United States Patent
Michalski

(10) Patent No.: US 6,523,016 B1
(45) Date of Patent: Feb. 18, 2003

(54) LEARNABLE NON-DARWINIAN EVOLUTION

(75) Inventor: Ryszard S. Michalski, Fairfax, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/548,286

(22) Filed: Apr. 12, 2000

Related U.S. Application Data

(60) Provisional application No. 60/128,805, filed on Apr. 12, 1999.

(51) Int. Cl.$^7$ ............................................. G06F 15/18
(52) U.S. Cl. ............................. 706/12; 706/13; 706/14
(58) Field of Search ............................. 706/12, 23, 13, 706/14; 703/6

(56) References Cited

U.S. PATENT DOCUMENTS

| | | | | |
|---|---|---|---|---|
| 5,136,686 A | * | 8/1992 | Koza | 706/13 |
| 5,140,530 A | * | 8/1992 | Guha et al. | 706/13 |
| 5,148,513 A | * | 9/1992 | Koza et al. | 706/13 |
| 5,222,192 A | * | 6/1993 | Shaefer | 706/13 |
| 5,245,696 A | * | 9/1993 | Stork et al. | 706/13 |
| 5,255,345 A | * | 10/1993 | Shaefer | 706/13 |
| 5,343,554 A | * | 8/1994 | Koza et al. | 706/13 |
| 5,390,282 A | * | 2/1995 | Koza et al. | 706/13 |
| 5,435,309 A | * | 7/1995 | Thomas et al. | 600/310 |
| 5,651,099 A | * | 7/1997 | Konsella | 706/13 |
| 5,742,738 A | * | 4/1998 | Koza et al. | 706/13 |
| 5,857,462 A | * | 1/1999 | Thomas et al. | 600/310 |
| 5,867,397 A | * | 2/1999 | Koza et al. | 703/14 |
| 6,058,385 A | * | 5/2000 | Koza et al. | 706/13 |
| 6,169,981 B1 | * | 1/2001 | Werbos | 706/23 |
| 6,360,191 B1 | * | 3/2002 | Koza et al. | 703/6 |

OTHER PUBLICATIONS

AI science vs. applications: accomplishments, failures and long-term goals, Michalski, R.S.; Computers and Communications, 1991. Conference Proceedings., Tenth Annual International Phoenix Conference on , 1991, pp. 846–847.*

Data–driven constructive induction in AQ17–PRE: A method and experiments, Bloedorn, E.; Michalski, R.S.; Tools for Artificial Intelligence, 1991. TAI '91., Third International Conference on , 1991, pp. 30–37.*

Learning textural concepts through multilevel symbolic transformations, Bala, J.W.; Michalski, R.S.; Tools for Artificial Intelligence, 1991. TAI '91., Third International Conference on , 1991, pp. 100–107.*

A method for partial–memory incremental learning and its application to computer intrusion detection, Maloof, M.A.; Michalski, R.S.; Tools with Artificial Intelligence, 1995. Proceedings., Seventh International Conference on , 1995, pp. 392–397.*

Experimental validations of the learnable evolution model, Cervone, G.; Kaufman, K.K.; Michalski, R.S.; Evolutionary Computation, 2000. Proceedings of the 2000 Congress on, vol.: 2, 2000 pp.: 1064–1071 vol. 2.*

* cited by examiner

Primary Examiner—Thomas Black
Assistant Examiner—Michael B. Holmes
(74) Attorney, Agent, or Firm—David G. Grossman

(57) ABSTRACT

The present invention relates to novel systems and methods in which a machine learning mode is used to generate new populations in an evolutionary process. A preferred embodiment of the present invention called Learnable Evolution Model (briefly, LEM) employs a machine learning mode at selected steps of evolutionary computation to determine reasons why certain individuals in a population are superior to others in performing a designated class of tasks. These reasons, expressed as inductive hypotheses, are used to create a new generation of individuals (phenotypes or genotypes). An evolutionary process in LEM can alternate between a machine learning mode and a Darwinian evolution mode switching to another mode, in any effective order, when a mode termination condition is met, or it can rely on a repetitious application of the machine learning mode with randomly or methodologically generated populations.

15 Claims, 8 Drawing Sheets

LEARNABLE NON-DARWINIAN EVOLUTION

This application claims the benefit of U.S. Provisional Application No. 60/128,805, filed Apr. 12, 1999, which is hereby incorporated by reference.

BACKGROUND OF THE INVENTION

Recent years have witnessed a significant progress in the development and applications of machine learning methods, in particular, in scaling them up to cope with large datasets (e.g., Clark and Niblett, 1989; Cohen, 1995; Dietterich, 1997; T. Mitchell, 1997; Michalski, Bratko and Kubat, 1998). There has also been a significant progress in the area of evolutionary computation (e.g., Koza, 1994; Michalewicz, 1996; Baeck, Fogel and Michalewicz, 1997; Banzhaf et al., 1998).

All conventional methods of evolutionary computation draw inspiration from the principles of Darwinian evolution in which basic operators are mutation, crossover (recombination), and selection of the fittest. These operators are very simple and domain-independent; thus, they can be employed without knowing a model of the problem domain (e.g., Holland, 1975; Goldberg, 1989; Michalewicz, 1996; M. Mitchell, 1996). Consequently, the Darwinian-type evolutionary computation has been applied to a wide range of problems, such as various kinds of optimization and search problems, automatic programming, engineering design, game playing, machine learning, pattern recognition, and evolvable hardware.

The Darwinian-type evolution is, however, semi-blind: the mutation is a random modification of the current solution; the crossover is a semi-random recombination of two solutions; and the selection (survival) of the fittest is a form of parallel hill climbing. In this type of evolution, individuals do not pass lessons learned from their experience to the next generation. Consequently, computational processes based on Darwinian evolution are not very efficient. Low efficiency has been the major obstacle in the application of evolutionary computation to very complex problems.

DESCRIPTION OF THE INVENTION

Figure 1:
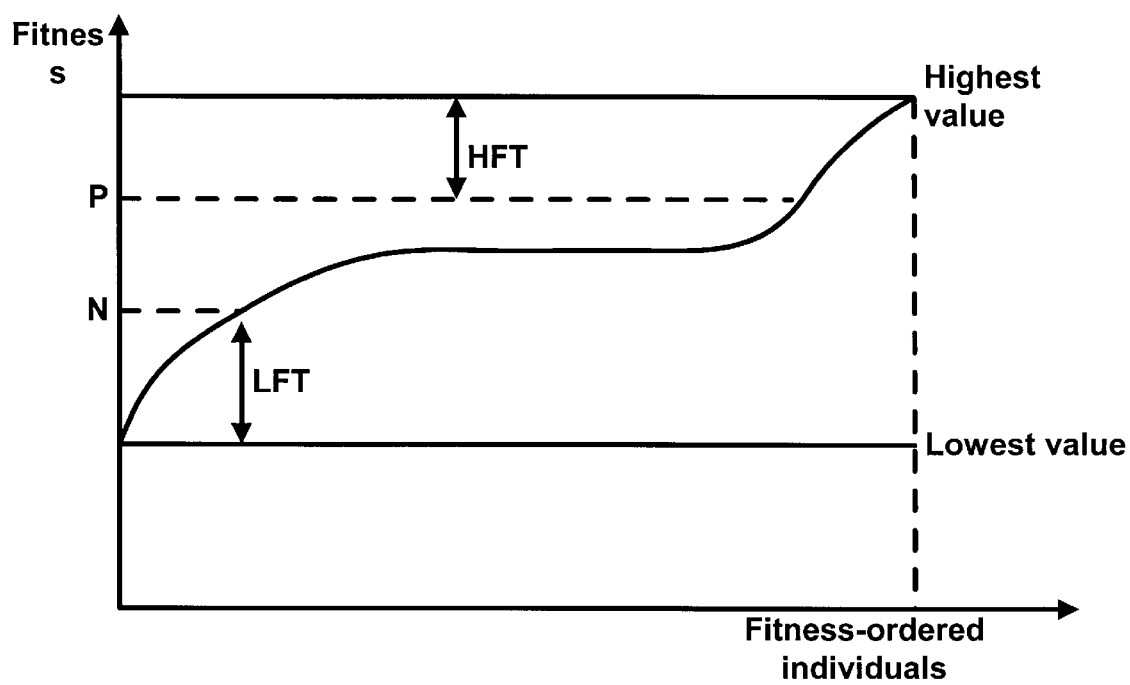
FIG. 1 is a fitness profile of a population. P and N are cut points above which and below which are individuals in HIGH and LOW groups, respectively.

The present invention relates to novel systems and methods for solving problems or designing systems by applying a new form of evolution. Specifically, a machine learning mode is used to generate new populations in an evolutionary process. A preferred embodiment of the present invention called Learnable Evolution Model (briefly, LEM) employs a machine learning mode at selected steps of evolutionary process to determine reasons why certain individuals in a population are superior to others in performing a designated class of tasks. These reasons, expressed as inductive hypotheses, are used to create a new generation of individuals (phenotypes or genotypes). An evolutionary process in LEM can alternate between a machine learning mode and a Darwinian evolution mode switching to another mode, in any effective order, when a mode termination condition is met, or it can rely entirely on the machine learning mode. The next section describes the LEM approach in more detail.

The Learnable Evolution Model or LEM is fundamentally different from the Darwinian-type model underlying current methods of evolutionary computation. The central engine of evolution in LEM is a machine learning mode, which creates new populations of individuals (genotypes or phenotypes) using generalizations or hypotheses characterizing behaviors of the current and possibly also previous populations. The machine learning mode consists of two processes-hypothesis generation, concerned with determining hypotheses explaining differences between well-performing and poor-performing individuals in a population (or in a collection of populations), and population generation, which employs generated hypotheses to create new generations of individuals. Thus, machine learning mode produces new populations not through a semi-random operations, but through a deliberate reasoning process involving a generation and an instantiation of hypotheses about populations of individuals.

LEM can alternate between the machine learning mode and the Darwinian evolution mode, or it can rely entirely on a repetitive application of the machine learning mode. By the Darwinian evolution mode, we mean a process of applying some forms of "natural" evolution operators, such as mutation, recombination (optionally) and selection ("survival of the fittest") to generate new populations. When using both modes, LEM switches from one mode to another mode whenever a mode termination condition is met. Such a condition represents a measure of persistence in continuing a given mode. When relying only on the machine learning mode, LEM continuously applies machine learning mode to evolving populations, and when the evolution progress is unsatisfactory or reaches a plateau, applies it to a new, randomly or selectively generated population. This is discussed in more detail below. In both variants, the evolution process continues until a LEM termination condition is met (a solution is satisfactory or allocated resources are exhausted).

LEM is also different from the Lamarckian type of evolution, because the process of generating new individuals takes into consideration not only the experience of a single individual, but of a whole population, or even a collection of populations. Thus, LEM could be viewed as a generalization of Lamarckian evolution.

The fundamental assumption underlying LEM, as any evolutionary process, is that there is a method for evaluating performance of individuals in evolving populations. Such a method, called a fitness function, assigns a quantitative or qualitative value to each individual, which characterizes its performance from the viewpoint of the assumed class of goals or tasks. The computability of the fitness function, or its approximation, is thus a precondition for the application of LEM. The output domain of a fitness function can be continuous (representing degrees to which individuals perform a given task) or discrete (representing different classes of performance).

Below is a General Form of LEM:

1. Randomly, or according to certain rules, generate a population individuals (in analogy to the evolution in nature, they may represent genotypes or phenotypes). When applying the model to evolutionary computation, individuals can represent problem solutions, designs, concept descriptions, plans, strategies, or any objects that are actors in an evolutionary process).

2. Invoke the Machine Learning Mode:
   a. Split the current population of individuals (solutions) into three groups: HIGH (high-performance), LOW (low-performance), and MEDIUM (medium-performance), based on the values of the fitness function. In some circumstances, the MEDIUM group can be empty.
   b. Apply a machine learning method to create a general description of HIGH individuals, which differentiates them from LOW individuals (and, optionally, a description of LOW individuals, which differentiates them from HIGH individuals).
   c. Generate a new population of solutions by replacing non-HIGH solutions in the population by those satisfying the newly generated description of HIGH solutions and hd-lookback (high description-lookback) descriptions generated previously. Alternatively, apply an incremental learning method that uses past descriptions (of HIGH individuals and, optionally, low individuals, and new individuals classified into HIGH and LOW groups, and produces new descriptions consistent with new HIGH individuals (optionally, also LOW individuals). Individuals satisfying these descriptions are generated randomly or according to certain description instantiation rules. This step may also involve generating more individuals that are needed for the replacement, and then selecting the best ones to maintain the assumed size of the population.
   d. Continue this mode until the machine learning mode termination condition is met (e.g., the best fitness in a sequence of learn-probe populations does not exceed the best fitness previously found by more than learn-threshold).
   e. If the machine learning termination condition is met, one of the three steps can be taken:
      (i) If the LEM termination condition is met, end the evolution process (such a condition may be that the best individual generated so far has reached a satisfactory fitness value, or that the allocated computational resources are exhausted). The best individual obtained at this point is the result of evolution.
      (ii) Repeat the process from Step 1,
      (iii) Go to step 3.

3. Invoke the Darwinian Evolution Mode, which applies Darwinian-type evolutionary operators, that is, some form of mutation, recombination (optionally), and selection to generate consecutive generations of populations. Continue this mode until the Darwinian evolution mode termination condition is met (e.g., the best fitness in a sequence of dar-probe populations does not exceed the best fitness previously found by more than dar-threshold).

4. Go to step 2, and then continue alternating between step 2 and step 3 until the LEM termination condition is met (e.g., the generated solution is satisfactory, or the allocated computational resources are exhausted). The best individual obtained at this point is the result of evolution.

The parameters learn-probe and dar-probe control persistence in continuing a given mode; specifically, they denote the number of population generations in the machine learning and Darwinian evolution modes, respectively, which are performed even when the progress of evolution observed in single generations is insufficient. The parameters learn-threshold and dar-threshold are supposed to control the degree of improvement required in order to continue a given mode. They can be defined in different ways, for example, they can be threshold ratio of the best fitness function value in the sequence of learn-probe and dar-probe populations to the best fitness in the previous sequence of populations in the machine learning and the Darwinian evolution mode, respectively. If defined this way, the parameters would typically be equal 1 or greater than 1, but they could also be smaller that 1 (in which case, a given mode would continue even if the best value in the sequence of populations generated in this mode is smaller than the previous best value). A mode termination condition can be relaxed or tightened by increasing or decreasing values of the above parameters, respectively.

If, when reaching the step 2(e)(ii), LEM always goes to step 1, then the evolution process repetitiously applies the machine mode, switching to new populations whenever a plateau of performance is reached. Thus, this form of evolution, called uniLEM, relies entirely on the machine learning guidance, without ever applying the Darwinian mode. For the purpose of distinction, the LEM's form that applies both modes is called duoLEM.

In the duoLEM form, the execution of steps 2 and 3 does not have to be in the order presented above. One can start first with the Darwinian mode, then follow the machine learning mode, and then alternate between then until the LEM termination condition is met.

When LEM chooses the start-over step, then it moves back to Step 1. A simple way to execute Step 1 is to generate a new population randomly. This is typically done when executing Step 1 for the first time. When it is executed as a start-over operation, the random generation method still applies, but one can also use alternative approaches, for example, mutate one of the previously created populations, or generate a new population using some filtering method, i.e., a method which allows some members of the random population to be eliminated or ignored, preserving only those which are useful. Useful members can be those which satisfy the high-quality description. Here are examples of methods for start-over population generation:

A. Avoid-past-failures. Generate randomly individuals, but include them in the new population, if they do not satisfy LowLookBack descriptions of LOW groups (the LowLookBack parameter defines the number of generations whose LOW group descriptions are to be taken into consideration). This method requires the generation of LOW group descriptions.

B. Select-elite. Generate randomly individuals, but include them in the new population only if their fitness is above certain threshold (e.g., above the mean fitness of the individuals in the last generated population).

C. Use-recommendations. The method requires storing a set of past HIGH group descriptions whose instantiations led to a jump in the maximal-so-far fitness (called "consequential descriptions") in the evolution process. A new population is generated by instantiating one or more randomly selected consequential descriptions.

Let us now comment briefly on the duoLEM. In the above LEM description, machine learning mode (Step 2) preceded the Darwinian evolution mode (Step 3). LEM can also be executed by starting with the Darwinian mode, and then alternating between both modes then until the LEM termination condition is met.

Generation of training examples in machine learning mode. In order to generate training examples for the machine learning mode, a population of individuals needs to be split into HIGH, LOW and MEDIUM groups. This can be done in different ways. One way is to use the fitness-based method, in which population is split according to fitness values. To do so, one uses two parameters, HFT ("high fitness threshold") and LFT ("low fitness threshold"). HFT and LFT, expressed as percentages, specify portions of the fitness values range in the population, which are used to determine HIGH and LOW groups, respectively. These parameters can be illustrated by using a fitness profile function, which maps individuals in a population, arranged in an ascending order, into their fitness (FIG. 1).

Individuals whose fitness value is no lower than HFT % from the highest fitness value (above point P in FIG. 1) are put into the HIGH group, and those whose fitness value is not higher than LT % from the lowest fitness value (below point N) are put into the LOW group. For example, if HFT and LFT are both 25%, then individuals with the fitness value no lower than 25% of the highest fitness, and no higher than 25% above the lowest fitness value are included the HIGH and LOW group, respectively.

This method may work well if the fitness profile function behaves similarly on both sides of the middle. If it is flat on one side and steep on the other side, then the method may produce highly uneven sizes of HIGH and LOW groups. For example, if it is flat at the beginning (FIG. 2), there may be much more negative examples than positive, and if it is flat at the end, there may be much more positive examples than negative. This situation is not favorable for producing high quality descriptions.

Figure 2:
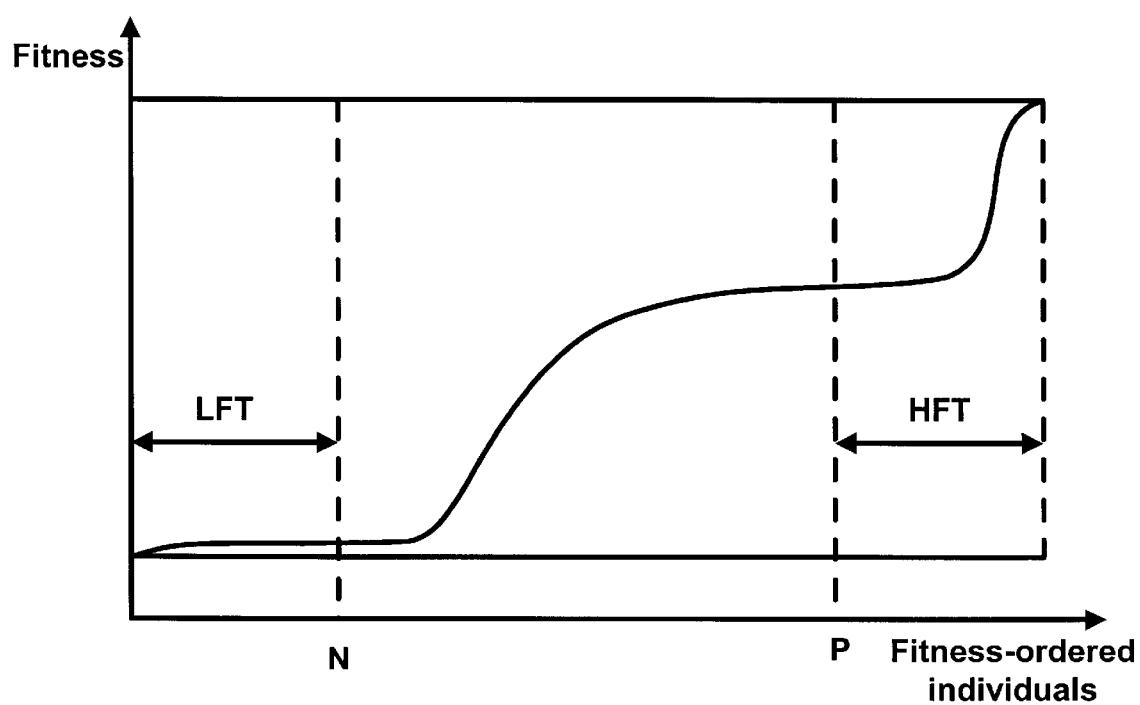
FIG. 2 is a fitness profile function that is flat at the beginning.

In such a situation one may apply a population-based method, in which the population is split according to an apriori defined portions of the population. This is done by using two parameters, HPT (the "high population threshold") and LPT (the "low population threshold"). HPT and LPT, expressed as percentages, indicate portions of the population that are used as HIGH (to the right of P), and LOW groups (to the left of N), respectively (FIG. 2).

The hd-lookback (high description lookback) parameter allows LEM to take into consideration not only the description of HIGH group individuals in a given step of the evolutionary process, but also those obtained in the previous steps. If hd-lookback is 0, only the description obtained in the current step is used to generate a new population. If hd-lookback is 1 (or more), then the current and the previous high group descriptions are taken into consideration when generating individuals for the new generation.

An alternative way to take into consideration past populations is to create a description of the union of HIGH groups determined in the past populations. Such a method can be controlled by the hs-lookback (high solutions lookback parameter). If hs-lookback is 0, only the current solutions (individuals) are used to generate a description of the HIGH solutions; if hs-lookback is 1 (or more), then individuals from the current and the previous generation are used in for generating a description. Thus, by using non-zero values of hd-lookback or hs-lookback parameters, LEM can take into consideration properties of an arbitrary number of past populations when generating a new population. As mentioned briefly earlier, an alternative method is to apply a method known in the field of machine learning as incremental learning. Such a method takes past descriptions (in this case, descriptions of HIGH individuals and, optionally, LOW individuals), and new individuals classified into HIGH and LOW groups, and produces a new, updated description of HIGH individuals.

A question arises as to how to proceed, if the range of fitness values in a population is zero (or approximately zero), or we have a repetition of the same high group individuals (or high group descriptions). Such a situation would occur when a population consists of (or includes) individuals at the local or the global optimum (maximum or minimum), or from a flat region of the landscape function (a function that assigns fitness to individuals in the search space). In this situation, the machine learning mode cannot continue.

If the population does not represent a global optimum, the evolution process, however, needs to continue, if we want to find such an optimum. In this case, LEM can either switch to the Darwinian evolution mode, or to be repeated with a new population of individuals. Such a new population can be generated randomly without a filter, randomly with a filter, or by mutating past generation. A filter can be defined, for example, by the descriptions of LOW group, determined in the current step, or a collection of descriptions of LOW groups determined in past steps of evolution. When using a filter, individuals are included in a new population only if they do not satisfy the LOW group(s) descriptions. Such a method may speedup the evolutionary process, as it eliminates from consideration portions of the search space that are likely to not contain the optimum. The length of the sequence of LOW groups descriptions to be taken into consideration is defined by the low description look-back parameter.

Given training examples for HIGH and LOW groups, one can, in principle, apply any machine learning method that can generate descriptions that discriminate between these groups (Michalski, 1993). Individuals in these groups may be points in a very high dimensionality space (a "multidimensional landscape"). An application of a machine learning method for differentiating between HIGH and LOW individuals can thus be viewed as a method for roughly approximating a differential of the fitness function spanned over such a landscape.

The machine learning mode can be executed by applying a rule learner or a decision tree learner, a neural net, grammatical inference, inductive logic programming, reinforcement learning, genetic algorithm-based learning, a multi-strategy concept learner, or other machine learning method. In the experiments presented here, we employed an AQ-type rule learner, which appears to be particularly suitable for the use in LEM ( see below for an explanation).

Generation of individuals according to a description. Let us now turn to the problem of generating new individuals using descriptions of HIGH groups. If d-lookback is 0, then we employ just one description, which distinguishes between HIGH and LOW individuals in the current population. If d-lookback is greater than 0, that we employ a collection of descriptions, which distinguish between HIGH and LOW individuals in the past populations. New individuals should satisfy these descriptions.

Descriptions in a such collection can be used individually or can be combined into a one global description through a logical intersection operation (the latter method may be difficult with some machine learning methods). When one applies collection of descriptions, the first one could be used for generating candidates, and the remaining ones can be applied as filters in a cascade fashion. Let us then assume that we have just one description.

Generating individuals that satisfy a given description is a description instantiation operation. It can be done in a variety of ways, and depends on the form of the description language employed by the machine learning method. To illustrate this step, let us assume that the description of HIGH individuals is in the form of attributional rulesets (see below for explanation).

Given such a ruleset, a new population is generated by creating different individuals (solutions, cases, instances, etc.) such that each of them satisfies at least one rule in the ruleset. It is desirable that at least two individuals are generated from each rule. The reason for this is that each rule represents a subspace in the search space. If any of these subspaces contain the global optimum, having at least two examples in it will allow the system to purse this global optimum.

A description instantiation process is done by assigning different combination values to variables in the rules of a ruleset. Each assignment must satisfy all conditions in one of the rules. For example, if one of the conditions in one of the rules is [color is blue or red or yellow], then new solutions can take any of the colors from the set {blue, red, yellow}. These values can be chosen randomly, or according to a probability distribution function (which, e.g., may represent the distribution of colors in the HIGH group). If a condition states, e.g., [the length of the solution is greater than or equal to 5 cm], then different solutions may have different length, but greater than or equal to 5 cm (at least approximately).

The choice of specific values, again, can be random, or based on some probability distribution function over the range <5 cm . . . Maximum Value>. The probability distribution function may implement the "maximizing-the-distance-to-the-negative" rule, that is, favor values that are further away from the values in the LOW group(s). For example, if solutions in LOW group have the length smaller than 5 cm, then the probability of selecting values for new individuals may grow with the distance from the 5 cm value toward the Maximum Value.

A question arises as to how to assign values to "free" attributes, that is, attributes that are not present in a description. This can be done in a variety of ways, for example, by randomly choosing values from the attribute domain, by choosing values that are present only in the examples of HIGH group, or by choosing them according to some distribution. What method of description instantiation should be used depends on the problem domain. In our initial testing experiments, free attributes were assigned values present in the examples of the HIGH group.

The LEM methodology can employ any Darwinian-type evolutionary computational method (genetic algorithm, evolutionary strategy, evolutionary programming, genetic programming, etc.), and any machine learning method that can create descriptions discriminating between groups of individuals (Michalski, 1983). Thus, the machine learning mode can be executed by applying a decision rule or tree learning method, neural net learning, grammatical inference, inductive logic programming, genetic algorithm-based learning, or other.

In a preferred embodiment of the invention, the method, and systems thereof, comprises one or more of the following steps, in any order which is effective to achieve the desired result: a) inputting a starting population of starting solutions to a problem; b) executing a Machine-Learning mode, comprising: i) sorting a population of solutions into at least a high quality group, medium quality, and a low quality group, where the quality is determined by a fitness function; ii) obtaining a description of the high quality group, where the description is obtained using a machine-learning algorithm and the description distinguishes the high quality group from the low quality group; iii) generating a Machine-Learning mode population of Machine-Learning mode solutions, where the Machine-Learning mode solutions satisfy the description of the high quality solutions; and c) repeating step b) until a predetermined Machine-Learning mode termination condition is met.

A preferred embodiment also includes methods and systems thereof: a) inputting a starting population of starting solutions to a problem; b) executing a Darwinian evolutionary mode and a Machine-Learning mode (in any order), wherein the Darwinian evolutionary mode comprises: i) generating a new population of new solutions to the problem by applying a Darwinian evolutionary method to the starting population; wherein the Machine-Learning mode comprises: i) sorting a population of solutions into at least a high quality group, medium quality, and a low quality group, where the quality is determined by a fitness function; ii) obtaining a description of the high quality group, where the description is obtained using a machine-learning algorithm and the description distinguishes the high quality group from the low quality group; iii) generating a new population of new solutions, where the new solutions satisfies the description of the high quality solutions.

The method can be used to find or generate solutions to any suitable problem, especially to optimize very complex functions or designing complex systems. For instance, the method can be applied to very complex optimization or search problems, to find maximum and minimum of functions of a large number of variables and/or parameters, in the design of complex engineering systems, to determine parameters for non-linear digital filters, to design high capacity heat exchangers, to design evolvable hardware, such as for engines and timers, to optimize any type of engineering design, to solve complex search problems, in software engineering, in intelligent agents, machine learning, automatic programming, in drug design, to generate improved organisms, such as plants, animals, viruses, and bacteria, generate improved proteins and nucleic acid catalysts (e.g., beginning with a naturally-occurring amino acid or nucleic acid sequence), optimize metabolic processes, etc.

The method typically begins with an initial or starting population of starting solutions which serves as the substrate or starting material upon which the method is implemented. The starting population contains at least two, but preferably more, different solutions to the problem. A large number, e.g., 10, 50, 100, or 500, of members of the starting population is preferred. By starting with large populations, new solutions can be obtained faster and more efficiently, as long as such populations are not too large to hinder the computational aspects.

The solutions in the starting population can be generated by any suitable means. For example, they can be generated randomly or using directed algorithms.

Once the starting population is inputted, the input is utilized to generate a first new population of new solutions to the problem by applying either the Darwinian evolution mode or the Machine-Learning mode to the starting population. Once initiated in either mode, the process is continued by switching between the modes until a termination condition is met, e.g., when the generated solution meets a certain criterion or the allocated computational resources are exhausted, or, the Machine learning mode can be applied exclusively.

The Darwinian evolution mode involves the application of a Darwinian-type evolutionary method or algorithm to the population. A Darwinian-type evolutionary method means, e.g., a method which uses at least one mutation operator (sexless reproduction), optionally a recombination operator (sexual reproduction) to generate individuals, and a selection operator. The generated individuals subjected to a selection step ("survival of the fittest") using the selection operator. Examples of Darwinian-type evolutionary methods include, genetic algorithms such as GA1 and GA2, evolutionary strategy, genetic programming, and evolutionary programming. Any suitable Darwinian-type evolutionary process can be used, e.g., useful algorithms are described in Mitchell, M., *In Introduction to Genetic Algorithms*, Cambridge, Mass., MIT Press, 1996; Michalewicz, Z., *Genetic Algorithms+Data Structures=Evolutionary Programs*, Springer Verlag, 3rd Edition, 1996; Goldberg, D. E., *Genetic Algorithms in Search, Optimization and Machine Learning*, Addison-Wesley, 1989; Banhaf et al., *Genetic Programming: An Introduction*, Morgan Kaufman Publishers, Inc., San Francisco, Calif., 1998; Koza, J. R., *Genetic Programming II: Automatic Discovery of Reusable Programs*, The MIT Press, 1994 (see, also an earlier book by the same author, *Genetic Programming: On the Programming of Computers by Means of Natural Selection*); Mitchell, M., *An Introduction to Genetic Algoriths*, Cambridge, Mass., MIT Press, 1996.

The Darwinian evolution mode can be applied repetitively, i.e., more than once. For instance, once the Darwinian-type evolutionary method has been utilized to find a population of first new solutions to the problem, these first new solutions can be modified a second, third, etc., time to obtain second, third, etc., new populations of solutions. The number of times the Darwinian Mode is performed can be arbitrary (e.g., X number of times), or, until a certain condition is met, e.g., a mode stopping condition is met. Such a stopping condition may be that the best solution found in sequence of K mode repetitions is not better than the best solution found previously. (This is controlled by dar-probe and dar-threshold parameters.)

Once the Darwinian evolutionary mode has been executed and a set of new solutions has been produced, the next step in the process is to switch to the Machine-Learning mode. The Machine-Learning mode comprises at least the following steps: i) sorting the population of solutions into at least a high quality group and a low quality group, where the quality is determined by a fitness function; ii) obtaining a description of the high quality group, where the description is obtained using a machine-learning algorithm and the description distinguishes the high quality group from the low quality group; and iii) generating a second new population of new solutions, where the new solutions satisfies the description of the high quality solutions.

The step of sorting the population of solutions into two or more groups (e.g., 3, 4, 5, or more), e.g., a high quality group, a medium quality group, and, a low quality group, where the quality is determined by a fitness function. A fitness function measures or estimates the quality of the solutions for a predetermined purpose, task, or objective. For example, when maximizing a function, the value of the function can be taken as a fitness value; when minimizing a function, a reciprocal of the function can be a fitness function; when designing a more efficient engine, the engine's efficiency would be a fitness function; when designing an organism to be resistant to temperature or parasites, such resistance would be a fitness function.

In the event that the new population can not be sorted into groups of different fitness, e.g., if the function is flat or asymptotic, then the process is switched to the Darwinian mode in order to generate new individuals which display diversity.

Once the individuals have been sorted into groups using a fitness function as a criterion, the next step involves an inductive learning process for determining "reasons" why certain individuals in a population are superior to others in performing a designated class of tasks. These reasons can be used, in the form of inductive hypotheses, for creating new generations of individuals (e.g., solutions to a problem).

The reasons why certain individuals are better than others in the population is determined using a machine-learning method. The machine learning method is used to derive a description of the high quality group, where the description distinguishes the high quality group from the lesser quality groups. Such a description can be in the form of a set of decision rules, a decision tree, a formal grammar, a neural net, or other form.

The learned description of the high quality group is used in subsequent steps to create a new set of individuals. This contrasts with the Darwinian evolution mode which is used to randomly evolve individuals and then subject the individuals to a selection step; the Machine Learning Mode, on the other hand, is used to determine what features of the selected individuals make them "fit." The alternation of both modes results in the production of superior individuals.

Any suitable machine learning method or system can be used, such as rule learning, decision tree learning, neural net, reinforcement learning, inductive programming method, grammatical interference, etc. In the examples below, the Machine Learning Mode employs the AQ-1 5 rule learning system using the VL1 concept representation language. Wnek et al., *Reports of Machine Learning and Inference Laboratory*, MLI 95-4, George Mason University, Fairfax., Va., March 1995.

At this point, operating in the Machine Learning mode, a new population of solutions is generated by creating individuals (solutions) that satisfy the general description learned using the machine learning method. Thus, the learned description is used to generate new solutions. These new individuals are instantiations of the description learned in the previous step. The instantiations can be done randomly or using some heuristics, e.g., generating more examples of the description from rules that cover more training examples. For example, if the description of HIGH individuals is in the form of decision rules (If CONDITION then DECISION), or decision trees (a tree structure in which nodes denote single conditions or tests and leaves are assigned decisions), then new individuals are generated by creating examples (cases, solutions, instances, etc.) that satisfy one or more decision rules (the decision tree). This can be done by assigning values to variables (or predicates) in the decision rules, or outcomes to test in such a way that the decision rules for the HIGH group are satisfied, or test outcomes that lead to a leaf in a decision tree assigned to the HIGH group.

If, for example, one of the conditions in a rule (or a decision tree) is [color is blue or red or yellow], then generated examples can take any of the colors from the set {blue, red, yellow}, chosen randomly, or according to some probability distribution (which may, e.g., approximate the distribution of colors in the "good" group of examples). If a condition states: [the length of the solution is greater than or equal ro 5 cm], then all examples generated must have the length greater than or equal to 5 cm. The choice of such solutions may be random, or may take values from the range (5 cm . . . Maximum value) according to a selected probability distribution. If examples in the LOW group have a length which is shorter than 5 cm, then the probability of selecting values for new examples may grow with the distance from the 5 cm value toward the Maximum Value (such a value selection rule is called "maximizing-the-distance-to-the negative").

The steps of the preferred embodiment can be performed again and again to obtain improved and high quality solutions or individuals. For example, once the Darwinian mode and Machine Learning Mode have been performed completely once, these steps can be performed one or more additional times to obtain an even better set of solutions to the problem. As mentioned, the process can be initiated in either mode; however, once begun, the Darwinian and Machine Learning modes are alternated to produce successive generations of individuals. Alternatively, as described above, the Machine Learning mode can be executed reiteratively, without the Darwinian evolution mode.

The method can be implemented in any electronic medium, including hardware, software, storage medium, and other suitable means. Suitable computer language, e.g., JAVA, C++, or other platform-independent languages.

In a preferred embodiment of the present invention called LEM-1, the machine learning mode employed an AQ-type rule learning method (Michalski et al., 1986; Wnek et al., 1995, Kaufman and Michalski, 1999). The AQ-type learning appears to be very attractive for implementing with LEM, because it generates descriptions in the attributional calculus, which has high representational power, is simple to interpret and understand, and is easy to use for generating instances satisfying the rules expressed in it. The AQ-type learning can also generate different kinds of rulesets (having different internal organizations and representing different levels of generality), which facilitates the experimentation and testing of LEM in different problem domains. Also, the fact that AQ-learning (as a rule learning method) generates a set of rules is also particularly beneficial for LEM, because individual rules can be interpreted as covering various subspaces where the optimum may be located. A ruleset description that discriminates between HIGH and LOW individuals facilitates a parallel search through many subspaces, which increases the probability of finding the global optimum solution.

The AQ-type descriptions of HIGH individuals that differentiate them from the LOW individuals can be viewed as a "symbolic differential" in multi-dimensional spaces spanned over multi-type attributes. This "symbolic differential" achieves a "symbolic zero" in the area of the subspace where the fitness function is optimal or flat. This "zero" is indicated by the lack of distinction between positive and negative examples.

In the Darwinian evolution mode, LEM-1 can employ different methods of evolutionary computation, e.g., a canonical genetic algorithm. In testing experiments, LEM-1 was compared with genetic algorithms GA1 and GA2. The next sections describe very briefly the AQ learning method and genetic algorithms GA1 and GA2, respectively.

AQ-type learning. Given a set of positive and negative training examples of a decision class, an AQ-type method generates a set of attributional decision rules (a ruleset) characterizing the given class. The attributional rules are descriptions expressed in attributional calculus, which is highly expressive and an easy to understand logic-based language. Its expressiveness is between the propositional calculus and predicate calculus.

Training examples are in the form of events, which are vectors of attribute values. Events in a given decision class (or class, for short) are considered positive examples of the class, and events from all other classes are considered negative examples. When rules for other classes are generated, the positive and negative example labels are changed accordingly.

Attributional rules for a given class are generated according to algorithm AQ, which pioneered the progressive covering (aka separate-and-conquer) approach to rule learning (e.g., Michalski, 1969; 1973). For completeness, here is a very brief description of a simple form of the AQ algorithm:

Select randomly a positive example, and call is a seed.

Generate a star of the seed, defined as a set of general attributional rules that cover the seed and any other positive examples, but do not cover negative examples (in a more general case, rules may cover negative examples, as long as they are of sufficient quality; e.g., Michalski and Kaufman, 1999).

Select the best rule from the star according to a given rule quality criterion (which is chosen to reflect the requirements of the given problem domain); for example, such a criterion my require to select a rule that covers that largest number of positive examples and is the simplest computationally among other similar candidates).

Remove examples covered by the rule from the set of positive examples, and select a new seed from the remaining positive examples. If there are no positive examples left, algorithm ends, otherwise, the control is passed to step 1.

The most important step of the algorithm is the star generation (step 2), which involves a multiple application of the extend-against generalization rule (Michalski, 1983), and logically multiplying-out attributional disjunctions and applying absorption laws (Michalski, 1999). If properly implemented, such a process can be executed very efficiently. For example, recent implementations of the AQ-type of learning have been very effectively applied to problems with hundreds of attributes and tens of thousands of examples.

The AQ-type learning programs, such as AQ-15c used in Study 1, and, in particular, AQ18, whose simplified version was used in Study 2, have many additional features. These features include the ability to learn different types of attributional rulesets (e.g., intersecting, disjoint, ordered, characteristic, and discriminant), to take into consideration different types of attributes (which can be nominal, interval, ratio or structured), to learn from noisy and/or inconsistent data, to discover strong patterns in the data, to learn incrementally, to match rules with examples using a strict or flexible matching method, and to automatically apply constructive induction. The latter method enables the program to search for a better representation space when the original one is found inadequate. For more details on AQ learning consult (e.g., Kaufman and Michalski, 1999; Michalski, 1999).

One of the distinguishing features of the AQ-type learning is that it strives to perform natural induction, that is, to produce inductive hypotheses in the form that appears most natural to people and thus is easy to understand and interpret. The latter feature is achieved by employing constructive induction and a representation language, called attributional calculus, that is highly expressive and easily interpretable in English.

The basic form of a rule in the attributional calculus is:

CONDITION→DECISION

Where CONDITION is a conjunction of attributional conditions, and DECISION is a simple attributional condition. An attributional condition is in the form:

[L rel R]

where
- L (left side) is an attribute, or one or more attributes with the same domain, joined by "&" or "v", called internal conjunction and disjunction, respectively.
- R (right side) is a value, a list of values from the domain of attribute(s) in L, joined by the symbol "v" (called internal disjunction), a pair of values joined by ".." (called range), or an attribute with the same domain as attribute(s) in L, and
- rel is a relational symbol from the set $\{=, \neq, \geq, >, \leq, <\}$.

Brackets [ ] are optional, and can be omitted whenever it causes no confusion. A condition [L rel R] is true (or satisfied), if expression L is in relation rel to R. Here are some examples of attributional conditions and their interpretation:

| | |
|---|---|
| [size = medium] | (the size of the object under consideration is medium) |
| [weight > 50] | (the weight is greater than 50) |
| [color = red v white v blue] | (the color is red or white or blue) |
| [width & length = 5..8] | (the width and length are both between 5..8) |
| [temperature = 2..5 v 25..60] | (the temperature is between 2 and 5 or 25 and 60) |
| [length & width > depth] | (the length and width is greater than depth) |

Note that attributional conditions are easy to interpret and are directly translatable to logically equivalent natural language expressions. The attributional calculus is based on the variable-valued logic system VL1 (Michalski, 1973). For more advanced features of attributional calculus see (Michalski, 1999).

In some situations, the HIGH and LOW sets now include individuals with the same fitness value, which is not desirable. The AQ-type learning approach can handle such individuals in three different ways: (1) include them only in the positive set, (2) include them only in the negative set, or (3) ignore them. The last approach seems most desirable, as it will discriminate only between individuals with different fitness values. This approach may be further extended by determining an equivalence class of individuals, for whom the fitness profile function below LT and above HT points differs less than some threshold, and then remove this class from consideration. A more sophisticated method, but computationally more expensive, would be to split ambiguous individuals on the basis of a probability distribution.

Algorithms GA1 and GA2 Used for Comparison with the Darwinian Evolution Mode: GA1 and GA2. As mentioned above, in the Darwinian evolution mode LEM-1 uses the GA1 algorithm. GA1 is a relatively simple genetic algorithm, which uses a real-valued representation of individuals in a population. The mutation operator in GA1 changes each gene (i.e., a value of a variable) with the probability of 1/L, where L is the number of genes. Selected genes are mutated by incrementing or decrementing their values by a fixed, small amount (0.1, in our experiments). The crossover operator takes two parent individuals, and produces a child, using a uniform single-point crossover. Each gene is thus inherited from each parent with equal probability.

To see how LEM-1's performance compares with the performance of conventional evolutionary computation algorithms, we applied GA1 and another genetic algorithm GA2 to the same set of testing problems. GA2 uses a binary representation of individuals. The mutation operator mutates each gene (variable value, in this case, 1 bit) with the same probability 1/L, where L is the number of genes. The mutation changes a value of the variable from 1 to 0 or vice versa. The crossover operator selects two parents and produces a child whose genes inherit a parent gene with a given probability of 0.95 for the first selected parent, and 0.05 for the second parent. The purpose of using two different genetic algorithms was to improve chances for obtaining good results from genetic algorithms in the comparative studies with LEM-1.

According to the LEM source, the program will switch modes if there's less than 1% change in the best-so-far from the previous generation or if three generations have gone by. As to the other information, the AQ input sample parameters were:

>run mode ambig trim wts maxstar echo criteria
>1 dc pos gen cpx 1 pve default

As already described above, LEM can be applied to any form of solutions, including, but not limited to, absolute value vectors, computer programs, descriptions in symbolic logic, design, plans, descriptions of genomes, etc. When an individual (i.e., a solution) is described, and continuous variables occur in this description, these variables can be used in LEM as continuous if an appropriate machine learning method is used in the machine learning mode of LEM (e.g., neural network), or if the continuous variables are discretized. Discretization in such cases can be accomplished by any suitable method, e.g., fixed discretization, or adaptive anchoring discretization as described herein below for the first time.

Handling Continuous Variables: Adaptive Anchoring Discretization (ANCHOR)

When LEM employs a learning program that works primarily with discrete variables (such as a typical rule learning program, e.g., AQ-type, Ripper or CN2, or a decision tree learning program e.g., C4.5, C5), and the problem at hand concerns searching in spaces spanned over continuous variables (which often occur, e.g., in function optimization), the variables need to be discretized. A problem then arises as to how to discretize variables in such situations. If the problem solution needs to represent one or more variables with high precision, then such a precision must be used in the learning program for these variables. In many cases, however, it is not known a priori which variables must be represented and with what precision.

A straightforward solution to the above problem is to discretize all the continuous variables with the maximal possible precision that one presumes is needed for the given task domain. There are two problems with such a solution. One is that it may happen that the guess regarding the needed precision is incorrect and the chosen precision is insufficient for the problem at hand. In this situation, the system may not be able to find the correct solution regardless of how long the evolution process is continued. The second problem is that such a method may lead to very large domains of attributes (the legal value sets), and this can significantly impede the performance of the learning system.

A solution to this is a method called Adaptive Anchoring Discretization, briefly, ANCHOR. The method is adaptive in the sense that the precision of quantization dynamically adapts to the problem at hand in the process of evolution. The term anchoring signifies that the domains of attributes consist of consecutively more precise discrete values that are rounded to the nearest whole numbers (anchors). This feature is reflective of human preference for representing number simply, that is, with the minimum number of digits sufficient for a given problem. The ANCHOR method proceeds by making discretizations that are consecutively more precise, but only in the ranges that are hypothesized as needing a higher precision. An adaptive quantization avoids an excessive precision, and by that can decrease the computational complexity of the learning process. The description of the ANCHOR method is split into three cases. One, when the domain of a variable contains only positive numbers; second, when the domain contains only negative numbers; and third, then the domain contains both types of numbers. Assume that a continuous variable $x_i$ ranges over the interval [MIN, . . . ,MAX], where MIN is the smallest possible value, and MAX is the largest value of $x_i$ to be considered.

Case 1: Positive Numbers Only (MIN $\geq$0)

(1) Determine $1^{st}$ Order Approximation:
A. Determine LB=MIN and UB=MAX (where LB stands for the lower bound and UP for upper bound) of the currently considered range.
B. Replace values of $x_I$ by the nearest first order anchor (FOA), defined as the best single digit approximation of $x_I$ (that is, in terms offirst order units or FOU).
C. Determine FOU If MAX >1, then FOU($x_I$) is defined as the digit 1 followed by the number of zeroes equal the number of digits in $x_I$ before "." minus 1

For example, FOU(2359.98)=1000

If MAX $\leq$1, then FOU($x_I$) is defined as 0.1

For example: FOU(0.3897638)=0.1
D. Replace $x_I$ by FOA($x_I$) defined as Round( $x_I$/FOU) where $\lfloor x_I/FOU \rfloor$ if $x_I/FOU - \lfloor x_I/FOU \rfloor < 0.5$ Round ($x_I$/FOU)=

$\lceil x_I/FOU \rceil$ if $x_I/FOU - \lfloor x_I/FOU \rfloor \geq 0.5$

E. Create the normalized first order approximation of $x_I$, NFOA($x_I$), by isomorphically mapping the domain of FOA($x_I$) into the range {0,1, . . . ,$d_I$}. Such a process is done when the AQ-type learning program is used in the machine learning mode of LEM (or any algorithm which works with discrete positive-valued attributes).
F. Continue executing LEM until the range of the fitness profile function becomes Delta-small. If the LEM termination condition has been satisfied, exit; otherwise, go to 2.

(2) Determine $2^{nd}$ Order Approximation:
A. Determine second order LB and UB, as the lower bound and the upper bound, respectively, or a sequence of LBs and UBs of the values of NFOA($x_I$) to be considered next (based on the range of values of NFOA($x_I$) in the last learned rulesets)
B. Determine second order unit (SOU)

If MAX >1, then SOU($x_I$) is defined as the digit 1 followed by the number of zeroes equal the number of digits in $x_I$ before "." minus 2.

Forexample, SOU(2359.98)=100

If MAX <1, then SOU($x_I$) is defined as 0.01

For example, SOU(0.358798)=0.01
C. Replace values of FOA($x_I$) in the ranges defined by the second order LB and UP, by the nearest second order anchor (SOA), which is the best double digit approximation of $x_I$ (i.e., in terms of the second order units or SOU) in these ranges.

D. Create a normalized second order approximation of $x_I$, NSOA($x_I$), by mapping isomorphically FOA($x_I$) and SOA ($x_I$) in corresponding ranges into one range {1, . . . ,$d_I$}. Such a process is done when the AQ-type learning program is used in the machine learning mode of LEM (or any algorithm which works with discrete positive-valued attributes).

Continue executing LEM until the range of the fitness profile function becomes Delta-small. If the LEM termination condition has been satisfied, exit; otherwise, go to 2.

An example of the SOA($x_I$):

{2000, (3000, 3100, 3200, 3300, 3400, 3500, 3600, 3700, 3800, 3900), 4000, 5000}

A corresponding NSOA($x_I$):

{0, 1, 2, 3, 4, 5, 6, 7, 8, 9, 10, 11, 12, 13}

(3) Determine Consecutively Higher Order Approximations in a Similar Fashion as Above, Until the LEM Stopping Condition is Satisfied.

Case 2: Negative Numbers Only (MAX <0)

Transform $x_I$ to $-x_I$ and apply the same procedure as above to the transformed $x_I$. The order of values in the domain of NSOA($x_I$) will be opposite to the order of negative numbers, that is the higher value of NSOA represent a higher negative value (but a smaller number).

Case 3: Positive and Negative Numbers (MIN <0 and MAX >0)

Apply the procedure described in Case 1 to the positive numbers and procedure described in Case 2 to the negative numbers . Assume that the anchors for negative values are negative integers and anchors for positive values, are positive integers. Map the whole range isomorphically into {0,1, . . . ,$d_I$}. The real "0" value of $x_I$ is thus mapped into an integer between 0 and $d_I$.

3. Example

Suppose that the domain of $x_I$ is a range of values between MIN=–2.3 and MAX=14.7.

FOA($x_I$) ranges over: {–2, –1, 0, 1, 2, 3, 4, 5, 6, 7, 8, 9, 10, 11, 12, 13, 14, 15}

NFOA($x_I$) ranges over {0, 1, 2, 3, 4, 5, 6, 7, 8, 9, 10, 11, 12, 13, 14, 15, 16, 17}

The real 0 is thus represented by 2.

Suppose that it was found from descriptions created by a learning program that FOA($x_I$) needs to be approximated more precisely for values of NFOA($x_I$) equal 5 and 6. In this case, SOA($x_I$) ranges over:

{–2, –1,0, 1,2,(3.0,3.1,3.2,3.3,3.4,3.5,3.6,3.7,3.8,3.9), (4.0,4.1,4.2,4.3,4.4,4.5,4.6, 4.7,4.8,4.9),5, 6, 7, 8, 9, 10, 11, 12, 13, 14, 15} and NSOA($x_I$) ranges over {0, 1, 2, 3, 4 . . . 33, 34, 35, 36}

Suppose now that it was found that values of NSOA($x_I$) equal 4, 14, 15 (values 2, 3.9 and 4.0 of SOA) need to be approximated more precisely. The third order approximation, TOA($x_I$), would then range over the domain:

{–2, –1, 0, 1, (2.1, 2.2, 2.3, 2.4, 2.5, 2.6, 2.7, 2.8, 2.9), (3.0, 3.1, 3.2, 3.3, 3.4, 3.5, 3.6, 3.7, 3.8, (3.90, 3.91, 3.92, 3.93, 3.94, 3.95, 3.96, 3.97, 3.98, 3.98, 3.99), ((4.00, 4.01, 4.02, 4.03, 4.04, 4.05, 4.06, 4.07, 4.08, 4.09), 4.1, 4.2, 4.3, 4.4, 4.5, 4.6, 4.7, 4.8, 4.9), 5, 6, 7, 8, 9, 10, 11, 12, 13, 14, 15} and NTOA($x_I$) would range over {0, 1, 2, 3, 4 . . . 51, 62, 63}.

As this example indicates, the growth of the domain size of a variable is adjusted to the needs of the problem at hand, and maintained as small as possible.

The version of the ANCHOR method presented above is called ANCHOR/E (ANCHOR with entire domain representation). This version always maintains a representation of the entire domain of the original variable. An alternative method is ANCHOR/S (ANCHOR with selective domain representation) that represents only the ranges of the original domain that are hypothesized to contain the solution.

A modification of ANCHOR/E needed to turn it into ANCHOR/S is straightforward: the ranges that were not found useful in a given run of the learning program would be ignored in the next iterations. Only the ranges that are found relevant would undergo further quantization.

An advantage of the ANCHOR/E version is that allows the system to notice that a higher order discretization might have been applied to inappropriate range, and to locally backtrack. The price for this possibility is that a larger domain of variables has to be maintained, and this makes the method more costly computationally. In contrast, ANCHOR/S is more efficient, but does not allow such local backtracking. If a backtracking appears to be needed, LEM would repeat the evolution process starting with a different initial population and the first order discretization.

EXAMPLES

Study 1:

This study applied LEM-1 and genetic algorithms, GA1 and GA2, to problems of optimizing five functions $f1$, $f2$, $f3$, $f4$, and $f5$, described in (De Jong, 1975; Goldberg 1989). These problems require solving different classes of function optimization tasks: simple and complex, continuous and discrete, with few and with many variables, with noise and without noise. In the study, LEM-1, GA1 and GA2 were applied to determine both the maximum and the minimum of each function.

$$f_4(x_i) = \sum_{i=1}^{30} ix_i^4 + Gauss(0, 1), \quad -1.28 \le x_i \le 1.28 \tag{f4}$$

Maximum: approximately 1248.225. Minimum: 0.

Figure 3:
FIG. 3 is an inverted, two-dimensional projection of function $f4$ of 30 variables.

FIG. 3 presents an inverted projection on two variables of this function.

Figure 4:
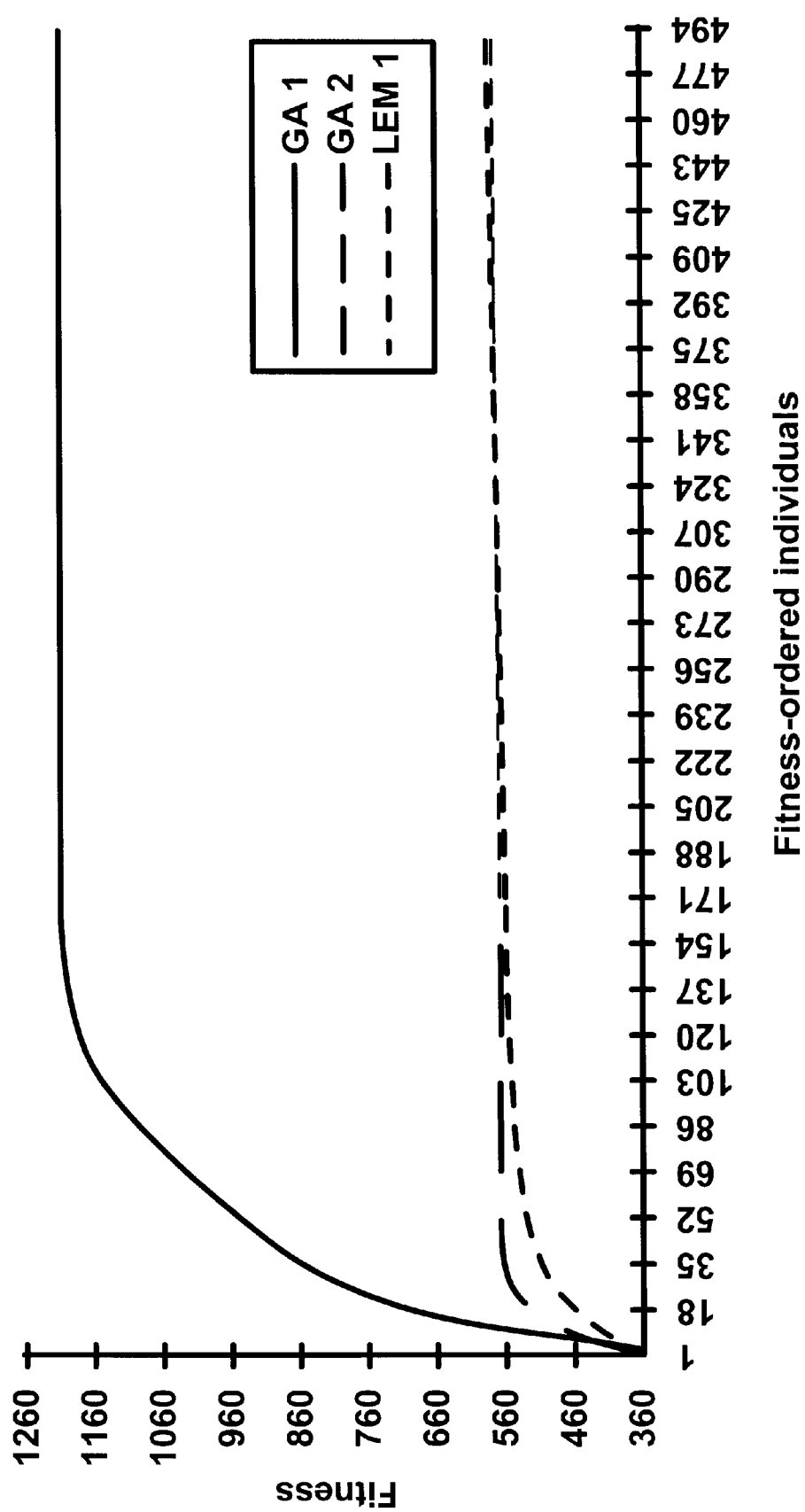
FIG. 4 shows the evolution process for finding the maximum of the function.

FIG. 4 presents graphically the results from applying GA1, GA2 and LEM-1 to the problem of finding the maximum of $f4$.

In the case, the fitness value corresponds to the function value. As we can see, in this experiment, LEM-1 dramatically outperformed GA1 and GA2. It came very close to the maximum already after the 150th generation, while GA1 and GA2 were still over 50% away from the maximum after the 500th generation.

To characterize the relative performance of the tested algorithms, we introduced a measure, called "Relative-Distance-to-Target," defined as the ratio of the difference between the target value (in this example, the function maximum) and the obtained value, to the target value, expressed in percentage, after a given number of generations. This measure was used to determine the δ-close number, defined as the number of generations in the evolutionary process after which the Relative-Distance-to-Target of the solution produced by an algorithm reaches a given value, δ. By dividing the δ-close number for GA1 and GA2 by the δ-close number for LEM-1, we estimated the LEM-1's evolution "speed-up" over GA1 and GA2, respectively. A speed-up of 10 means that LEM reaches the given δ-close fitness function value in 10 times fewer evolution generations than the algorithm with which it is being compared. Table 1 shows the speed-up of LEM over GA1 and GA2 for different values of δ.

TABLE 1

LEM1's speed-up over GA1 and GA2 for different values of δ

LEM Speed-up Ratio for Different δ

| δ | 1.0% | 2.0% | 3.0% | 4.0% | 5.0% | 6.0% | 7.0% | 8.0% |
|---|---|---|---|---|---|---|---|---|
| GA1/LEM | >>20.37 | >>66.23 | >>75.76 | >>83.33 | >>86.21 | >>90.91 | >>102.0 | >>103.1 |
| GA2/LEM | >>20.37 | >>66.23 | >>75.76 | >>83.33 | >>86.21 | >>90.91 | >>102.0 | >>103.1 |

*GA1 and GA2 solutions have not become δ-close to the maximum within 10,000 generations;
">>N" means that if a solution was δ-close at 10,000th generation, the speedup would be N (200,000 births).

For the sake of space, we present here only results from optimizing the function with the largest number of variables among all the functions considered (function $f4$, with 30 variables and a Gaussian noise). Other results are described in (Michalski and Zhang, 1999). The first part presents results from seeking the function maximum (a multi-mode problem), and the second part presents results from seeking the function minimum (a uni-mode problem).

In this study, LEM-1 was run with the HIGH, MEDIUM and LOW parameters that selected 25%, 50% and 25% of individuals in a population, respectively. Parameters used were gen-length, gen-threshold, learn-length, and learn-threshold.

Problem 1:

Find maximum of a function of 30 continuous variables and Gaussian noise

Problem 2: Find the Minimum of the Function $f_4$.

In these experiments, the fitness value of an individual is inversely related to the function value. All the other experimental conditions remained the same as in Problem 1. Results from the experiments are presented in FIG. 5.

Figure 5:
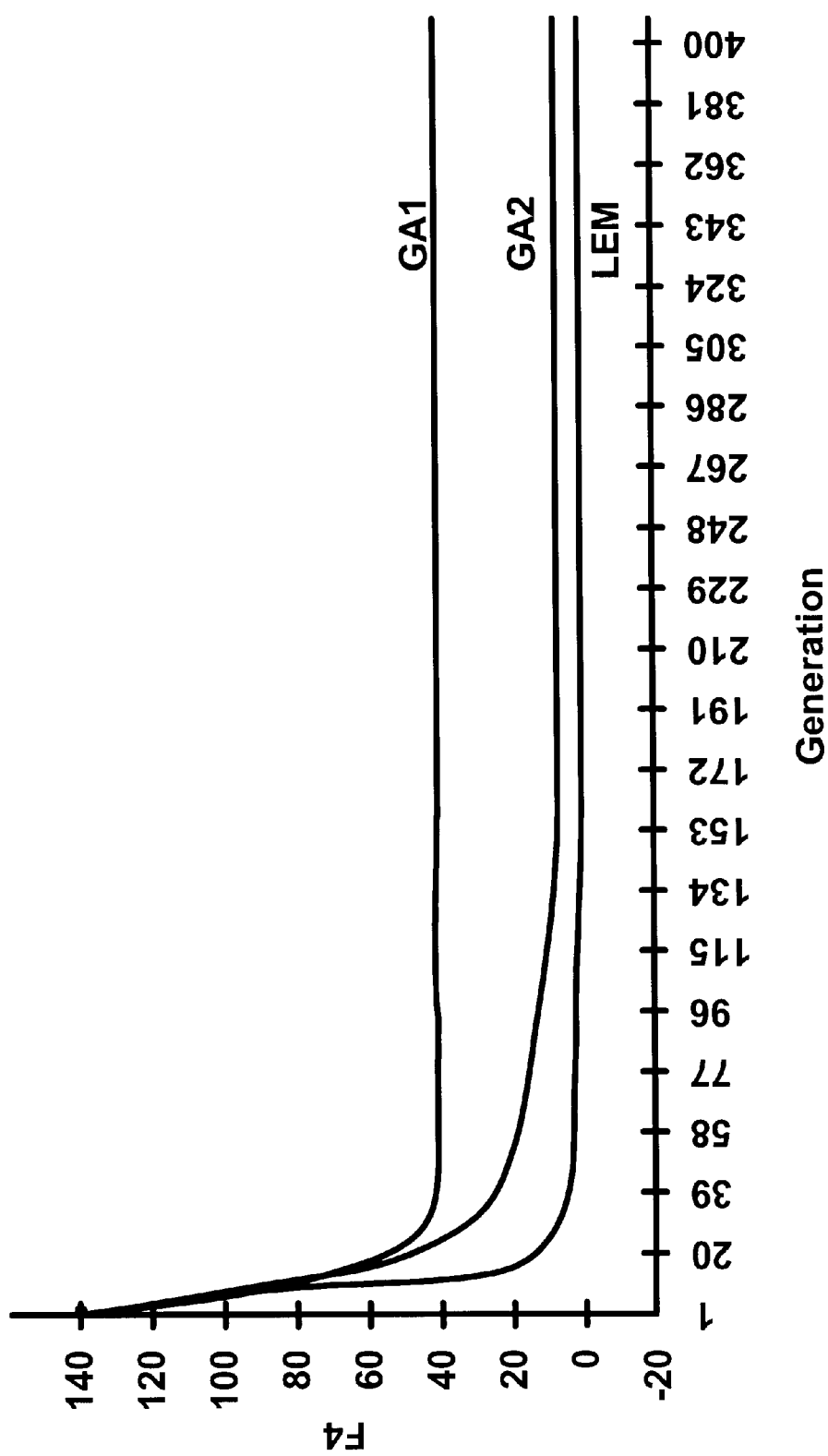
FIG. 5 shows the evolution process for finding the minimum of function.

As shown in FIG. 5, LEM-1 converged to the function minimum much faster than GA1, and also faster than GA2. Note, however, that the LEM-1's Darwinian evolution mode employs GA1 not GA2.

Study 2: Designing Digital Filters

To see how LEM-1 compares to GA1 and GA2 on different kinds of problems, these programs were applied to problems in designing digital filters. This work was described in detail in (Coletti etal., 1999). Here, for illustration, we present a small sample of the results. The fitness function was defined by equations specifying linear and nonlinear filters described in (Yao and Sethares, 1994).

Below, we present briefly only the results from applying GA1, GA2, and LEM-1 to the problem of determining optimal parameters of nonlinear filters. Such filters are defined by the equation:

$$y(k) = \left[\frac{3 - 0.3y(k-1)u(k-2)}{5 + 0.4y(k-2)u^2(k-1)}\right]^2 +$$

$$(1.25u^2(k-1) - 2.5u^2(k))\ln(|2.25u^2(k-2) - 2.5u^2(k)|) + n(k)$$

where: k_is the sample index (or time), n( )_is a noise component ranging from −0.25 to 0.25, and u( )_an inserted function (sin, step, random)

To define a problem for evolutionary computation, coefficients −0.3, 0.4, 1.25, and −2.5 in the above equation were assumed to be variables, whose values are unknown. The problem was to determine their appro priate values from a set of <vectori, y(vectori)> pairs, where vectorI is a list of values of the coefficients. Individuals in the population are thus vectors with four real-valued variables ("genes"). When substituted in the equation, the individual's genes yield a result that is compared with the correct value. The fitness of an individual is inversely proportional to the difference between the result and correct value. The individual whose gene coefficients give the lowest error is thus assigned the highest fitness. The parameters of the genetic algorithms used were described in Coletti et al., 1999:

| Gene representation | Real |
|---|---|
| Number of genes per individual | 4 |
| Gene landscape (constraint on range) | −30 to 30 |
| Number of individuals per generation | 60 |
| Mutation Rate | 25% |
| Maximum number of births | 100,000 |
| Maximum number of generations | 1500 |

In the experiments, three different sets of input data to LEM-1, GA1, and GA2 were used. In the machine learning mode of LEM-1, the HIGH, MEDIUM and LOW groups constituted 30%, 40% and 30% of individuals in a population, respectively. The population of each generation was 20; the learn-length was 3, the learn-threshold was 0.01; gen-length was 3, gen-threshold was 0.01. Each variable was quantitized into 200 ranges. Each program was executed 10 times, each time using a different input data. Runs differed in the seeds used for starting a random number generator. Presented results are averages of results obtained in these runs. LEM-1 and genetic algorithm GA1 used the same seeds.

Yao and Sethares used a uniformly distributed random input over the interval (−2.5, 2.5). In addition to this input, a unit step function 2.5 u(k) and a sine wave 2.5sin(_/10) were used for comparison. The landscape function generated an output array based on a 200 sample input sequence and stored it for comparison against the populations. Populations were generated, and the fitness of each individual was calculated by computing the mean-square error between the known values and the output generated by the individual's genes. The fitness function was defined as in (Yao and Sethares, 1994), namely, as the reciprocal of the mean-square error over the 200 sample window:

$$Fitness = \frac{1}{MeanSquareError} = \frac{200\ Samples}{\Sigma_{200 SampleWindow}(individual - known)^2}$$

LEM-1, GA1, GA2 were applied ten times using uniform noise, sine, and step function inputs. The initial populations were generated randomly. The convergence rate varied greatly between populations and generations due to the random initial conditions. It was difficult to obtain a meaningful average performance, because a few runs would dominate the average. Therefore, for comparing performance we used representative solutions. They were learning curves that converged the fastest for each of the three systems for different input functions. For a non-linear filter, experiments were performed with uniform random input, unit step input, and sine wave input. In all cases, LEM-1 outperformed GA1 and GA2. For illustration, FIGS. 6–8 show results for the case of a nonlinear filter with a uniform noise input.

Figure 6:
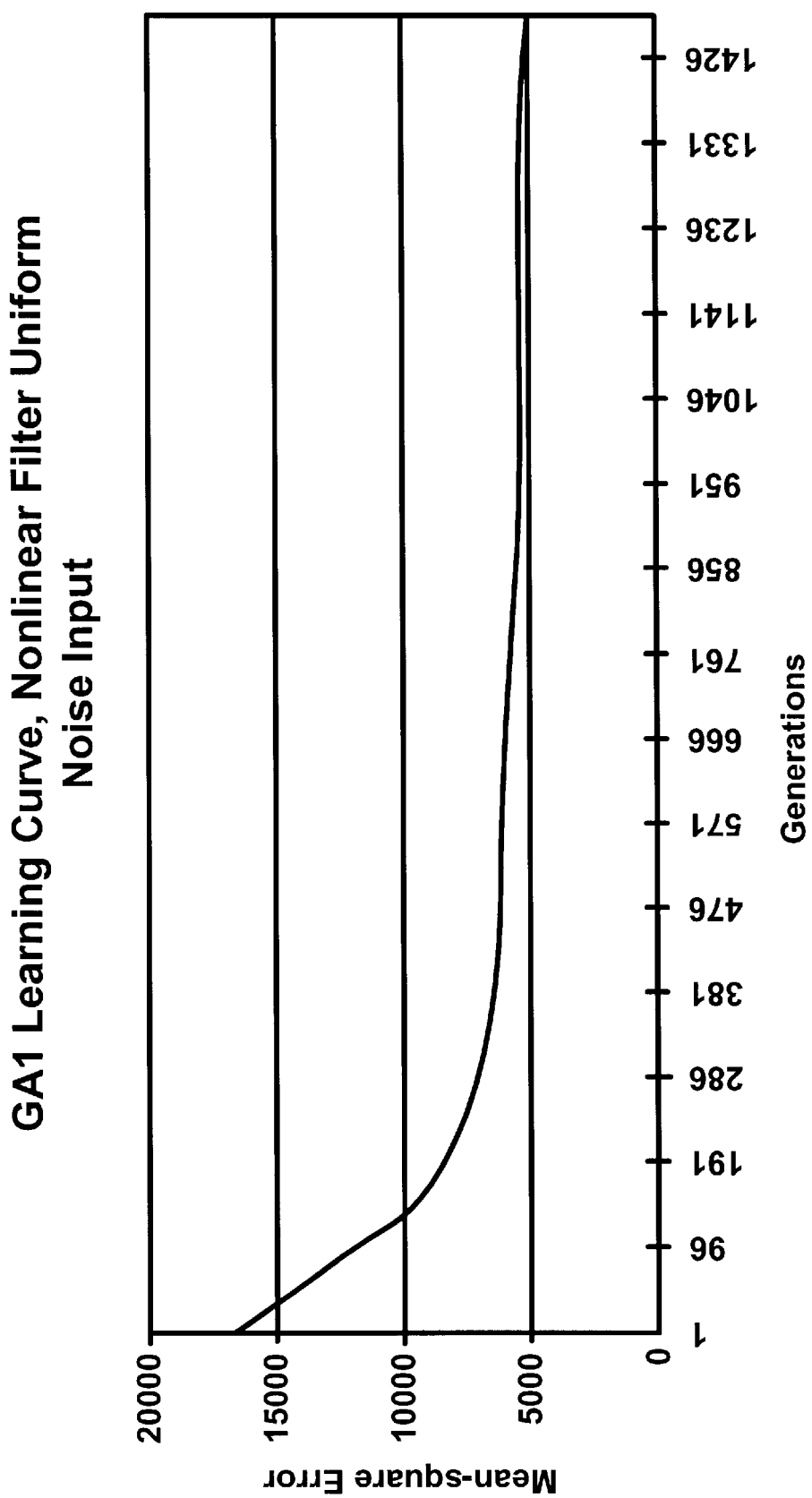
FIG. 6 is a GA1 learning curve for nonlinear filter with uniform random noise input.
Figure 7:
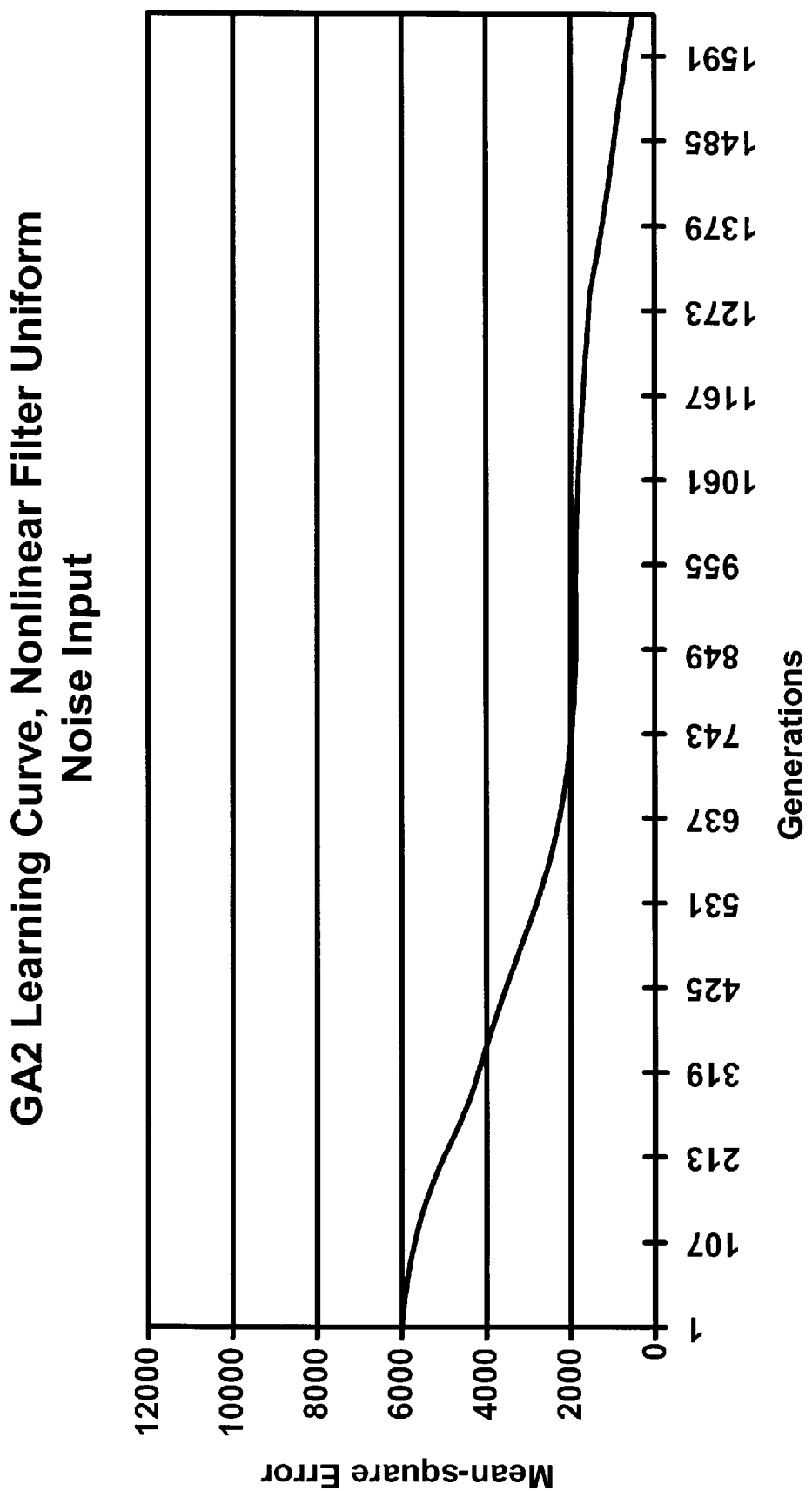
FIG. 7 is a GA2 learning curve for nonlinear filter with uniform random noise input.
Figure 8:
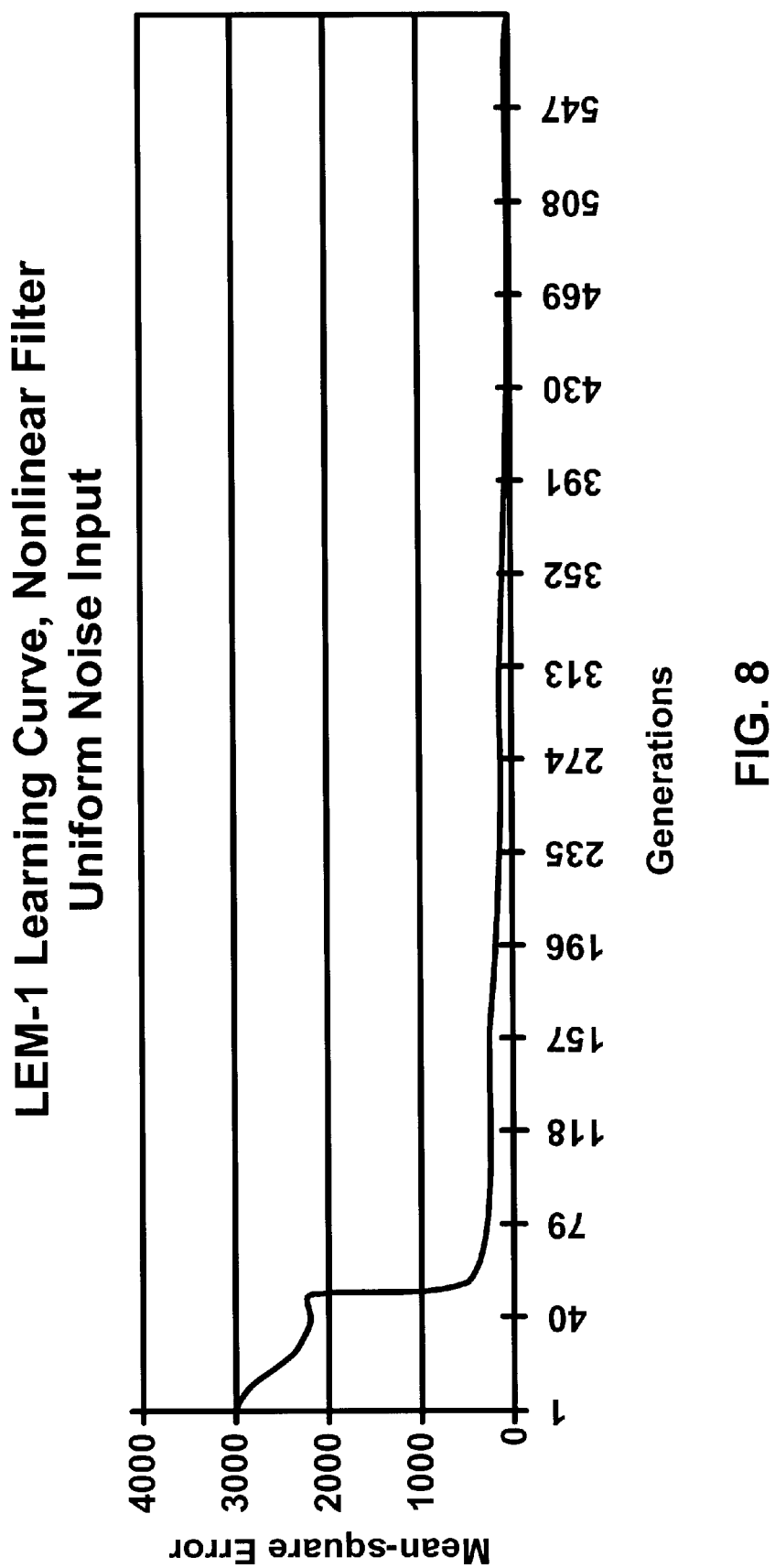
FIG. 8 shows a LEM-1 learning curve for nonlinear filter with uniform random noise input.

As the FIGS. 6–8 show, the convergence of GA1 and GA2 was relatively slow. The effect of the machine learning mode is demonstrated by a dramatic drop in the mean-square error when the system learned good rules for generating the next generation of individuals. LEM-1 toggles into machine learning mode roughly 10–800 times through out the course of a typical experiment. A dramatic drop in the mean-square error usually occurred within the first 100 generations. Because four genes were used to represent the four parameters of the filter, the error surface generated by the mean-square error is four-dimensional.

Such an error surface creates difficulties for traditional search techniques. These techniques, for example, the gradient descent and LMS, are subject to finding local minima, and they would have to run in parallel to achieve the robustness of the evolutionary computation approach. LEM-I alleviates much of the computational cost of the genetic algorithm approach by accelerating the evolutionary process through a series of symbolic learning steps.

Study 3: Morphogenetic Systems

The objective of this study was to apply LEM1 as a tool in the development of morphogenetic systems. By a morphogenic system we mean a system that is "grown" from "chromosomes" in analogy to biological systems, such as plants and animals. In this study, LEM-1 was applied to "grow" a task-oriented neural net in a cellular automata space. To this end, we employed a program that allows a user to grow neural nets in a simulated cellular automata machine. The program, which we call here for short, NC (a neural net in the cellular automata simulator), was developed by Dr. Hugo de Garis and his collaborators at the ATR Brain Building Laboratory in Japan (the BRAIN-CAM method). CA uses a standard genetic algorithm for implementing a morphogenetic process within a cellular automata system.

To make this section self-contained, below is a brief description of the major steps in the CA method:

(1) Design a fitness function that characterizes the task system (in this study, a neural net in the cellular automate space, which performs a desirable function)

(2) Randomly generate a population of individuals, called chromosomes (in the first implementation of the system, chromosomes were integer strings, in the next implementation, they are arrays. In these experiments, we used the second implementation) .

(3) Use chromosomes to grow a neural net in the cellular automate space, according to hand-crafled rules that govern the growth of a neural net from the "genes" in chromosomes.

(4) Calculate the fitness value of each neural net in a population, and assign this fitness value to the chromosome that led to the generation of the corresponding net.

(5) Sort in ascending order the chromosomes that generated neural nets, according to the fitness value of these nets.

Replace the half of the chromosomes with the lowest fitness value by the half with highest fitness value.
(6) Randomly select from the generated population pairs of individuals and perform the crossover operation. Randomly determine one cutting point, and exchange portions between two individuals around this point.
(7) Mutate each chromosome so obtained.
(8) Repeat the sequence of steps $3 \geq 7$, until the best fitness value of a chromosome is above a given threshold, or the number of iterations (generations) reaches a predefined threshold.

In the current implementation of NC, 30% individuals in the new generation were generated by crossover, and the rest were copied from the parent generation. The probability of mutating a gene in a chromosome was set to 0.02.

The NC-LEM system: Combining NC with LEM.

In this study we incorporated the LEM method in the NC system in order to speed-up the process of evolving task-oriented systems. The general idea is to use symbolic learning to determine the "reasons" why some chromosomes produce systems perfonning a given task better, and other chromosomes produce systems performing it worse. These reasons are expressed in the decision rules generated by a symbolic learning system (in this study, AQ15), using data from experiments performed. The rules are then used to generate a "better" population of chromosomes in the next generation of the evolutionary process. Below is a description of the first version of this system, called for short NC-LEM.

(1) Randomly generate the first generation of chromosomes for evolution (arrays of numbers).
(2) Execute the genetic -based system growing process (NC): if the fitness of the best individual in the population is not improved by the given gen-threshold, in consecutive gen-length generations, transfer control to the symbolic learning mode (AQ)
(3) Execute the machine learning mode:
  Determine HIGH and LOW solutions in the current population. The HIGH solutions are HT % (HT is a threshold <50%) best solutions in the population, and the LOW solutions are LT % (LT is a threshold <50%) worst solutions. The "best" and "worst" are determined on the basis of a given fitness function.
  Apply a symbolic learning method (e.g., the AQ-type) for determining rules distinguishing HIGH and LOW solutions. Each gene (a cell in the CA matrix—see below) in a chromosome is considered to be an attribute with K values (there are K types of genes).
  Generate a new population of solutions by replacing not-HIGH individuals by those satisfying the learned rules (the selection of such individuals is random or done according to some selection rules).
  Continue the process as long as the best solution within a sequence of learn-length iterations is better by the learn-threshold than the previously found best solution
(4) Repeat the process from step 2. Continue switching between (2) and (3) until the termination condition is met (e.g., the solution is satisfactory, or the allocated computational resources are exhausted).

The CA matrix generally can be a 3D cube (a 3D chromosome). In the pilot experiments, CA was a 12×12×1 cube, that is, a two-dimensional matrix. Thus, the number of genes was 144, and the number of gene types was K=128 (a nominal attribute). The gene types represent different types of actions in the cellular automata space. Thus, the total representation space was $128^{149}$ (a number exceeding by far the number of atoms in the universe).

In this study, NC-LEM, was applied to the problem of evolving a "timer" circuit. The desired output from the circuit during 100 clock cycles is to be 0 for the first 40 clocks, 1 for the next 30 clocks, and 0 again for the remaining 30 clocks. Two populations were used in the experiments, one of size 10, and second of size 20. For each population size, NC system, and NC-LEM were executed.

NC-LEM was initially "stuck" for many generations (about 640) at a local optimum, but then relatively quickly moved toward the correct design. The NC was at first gradually improving on the initial solution, but then got "stuck" toward the end of the experiment (at 4000 generations) at the local optimum, and did not reach the correct design.

For a population size of 20, NC-LEM reached a near-perfect solution after about 300 generations, while NC reached a similar solution after about 1700 generations.

Ackley, D. and Littman, M. "Interactions Between Learning and Evolution," In C. G. Langton, C. Taylor, J. D. Farmer, and S. Rasmussen (eds), Artificial Life II, Addison-Wesley, 1992.

Baldwin, J. M. "A New Factor in Evolution," American Naturalist, vol 30, pp.441–451, 536–553, 1896.

Baeck, T., Fogel, D. B., and Michalewicz, Z., (Eds.), Handbook of Evolutionary Computation, Oxford University Press, 1997.

Banzhaf, W., Nordin P., Keller R. E., Francone F. D., Genetic Programming: An Introduction, Morgan Kaufinan Publishers, Inc., San Francisco, Calif., 1998.

Bloedorn, E., Kaufman, K., Michalski, R. S., and Zhang, Q., "An Implementation and User's Guide of the AQ18 Learning and Data Mining Environment," Reports of the Machine Learning and Inference Laboratory, George Mason University, 1999 (to appear).

Bloedorn, E. and Michalski, R. S., "Data-Driven Constructive Induction: A Methodology and Its Applications", Special issue on Feature Transformation and Subset Selection, IEEE Intelligent Systems Huan Liu and Hiroshi Motoda (Eds.), March-April 1998.

Clark, P. and Niblett, R., "The CN2 Induction Algorithm, "Machine Learning, No.3, 1989.

Cohen, W. W., Fast Effective Rule Induction, Proceedings of the Twelfth International Conference on Machine Learning, 1995.

Coletti, M., Lash, T., Mandsager, C., Michalski, R. S., Moustafa, R., "Comparing Performance of the Learnable Evolution Model and Genetic Algorithms on Problems in Digital Signal Filter Design", The 1999 Genetic and Evolutionary Computation Conference (GECCO), in Orlando, Fla., Jul. 13–17, 1999 (accepted for presentation).

de Garis, Hugo, "CAM-BRAIN: The Evolutionary Engineering of a Billion Neuron Artificial Brain by 2001 Which Grows/Evolve at Electronic Speeds Inside a Cellular Automata Machine (CAM)," Lecture Notes in Computer Science—Towards Evolvable Hardware, Vol. 1062, pp 76–98, Springer-Verlag, 1996.

De Jong, K. A., "An Analysis of the Behavior of a Class of Genetic Adaptive Systems", Ph.D. thesis, Department of Computer and Communication Sciences, University of Michigan, An Arbor, 1975.

De Jong, K. A., Evolutionary Computation: Theory and Practice, MIT Press, 1999 (to appear).

Dietterich, T. G., Machine-Learning Research: Four Current Directions, AI Magazine, Vol. 18, No.4, 1997.

Goldberg, D. E., Genetic Algorithms in Search, Optimization and machine Learning, Addison-Wesley, 1989.

Grefenstette, J. "Lamarckian Learning in Multi-agent Environment," Proceedings of the Fourth International Conference on Genetic Algorithms, R. Belew and L. Booker (Eds.), San Mateo, Ga.: Morgan Kaufmann, pp. 303–310, 1991.

Hinton. G. E., and Nowlan, S. J. "How learning can guide evolution," Complex Systems 1: 495–502, 1987.

Holland, J., Adaptation in Natural and Artificial Systems, Ann Arbor: The University of Michigan Press, 1975.

Koza, J. R., Genetic Programming II: Automatic Discovery of Reusable Programs, The MIT Press, 1994.

Michalewicz, Z., Genetic Algorithms+Data Structures= Evolution Programs, Springer Verlag, Third edition, 1996.

Michalski, R. S., "Discovering Classification Rules Using Variable-Valued Logic System VL1," Proceedings of the Third International Joint Conference on Artificial Intelligence, Stanford, Calif., pp. 162–172, 1973.

Michalski, R. S., "A Theory and Methodology of Inductive Learning," Artificial Intelligence, Vol 20, No. 2, pp. 111–161, 1983.

Michalski, R. S. and Kaufman, K, "A Measure of Description Quality for Data Mining and Its Implementation in the AQ18 Learning System", *Proceedings of the International ICSC Symposium on Advanced in Intelligent Data Analysis*(AIDA), The Rochester Institute of Technology, Jun. 22–25, 1999. (Accepted for presentation and publication.)

Michalski, R. S., Learnable Evolution: Combining Symbolic and Evolutionary Learning, Proceedings of the 4th International Workshop on Multistrategy Learning, Decenzano del Garda, Italy, Jun. 11–14, 1998.

Michalski, R. S., "Natural Induction: Theory, Methodology and Its Application to Machine Learning and Knowledge Discovery," Reports of the Machine Learning and Inference Laboratory, George Mason University, 1999 (to appear).

Michalski, R. S., Mozetic, I., Hong, J., N. Lavrac, "The AQ15 Inductive Learning System: An Overview and Experiments," Reports of the Intelligent Systems Group, No. 86–20, UIUCDCS-R-86-1260, Department of Computer Science, University of Illinois, Urbana, 1986.

Michalski, R. S., "Inferential Theory of Learning: Developing Foundations for Multistrategy Learning," in Machine Learning: A Multistrategy Approach, Vol. IV, R. S. Michalski and G. Tecuci (Eds.), Morgan Kaufinann, San Mateo, Calif., 1994.

Michalski, R. S., Bratko, I. and Kubat, M., Machine Learning and Data Mining: Methods and Applications, John Wiley and Sons, 1998.

Mitchell, M., An Introduction to Genetic Algorithms, Cambridge, Mass., MIT Press, 1996.

Mitchell, T. M., "Does Machine Learning Really Work," AI Magazine, Vol. 18, No.3, 1997.

Sebag, M. and Shoenauer, M., "Controlling Crossover Through Inductive Learning" In Y. Davidor, H. P. Schwefel, and R. Manner (eds.), Proceedings of the 3rd Conference on Parallel Problem Solving from Nature, Springer-Verlag, LNVS 866, pp.209–218, 1994.

Vafaie, H. and De Jong, K. A., "Improving the Performance of a Rule Induction System Using Genetic Algorithms," Proceedings of the First International Workshop on Multistrategy Learning, MSL-9 1, Harpers Ferry, WV, Nov. 7–9, 1991.

Wnek, J., Kaufman, K., Bloedorn, E. and Michalski, R. S., "Inductive Learning System AQ15c: The Method and User's Guide," Reports of the Machine Learning and Inference Laboratory, MLI 95-4, George Mason University, Fairfax, Va., March 1995.

Michalewicz, Z., Genetic Algorithms +Data Structures= Evolution Programs, Springer Verlag, Third edition, 1996.

Goldberg, D. E., Genetic Algorithms in Search, Optimization and Machine Learning, Addison-Wesley, 1989.

Banzhaf, W., Nordin P., Keller R. E., Francone F. D., Genetic Programming: An Introduction, Morgan Kaufman Publishers, Inc., San Francisco, Calif., 1998.

Koza, J. R., Genetic Programming II: Automatic Discovery of Reusable Programs, The MIT Press, 1994. (see also an earlier book by the same author, Genetic Programming: On the Programming of Computers by Means of Natural Selection)

Mitchell, M., An Introduction to Genetic Algorithms, Cambridge, Mass., MIT Press, 1996.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above and below are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of generating solutions to problems by learnable evolution model (LEM), comprising:
    a) inputting a population of solutions to a problem;
    b) executing a Machine-Learning mode, comprising:
        i) sorting a population of solutions into at least a high quality group, medium quality (which can be empty), and a low quality group, where the quality is determined by a fitness function;
        ii) obtaining a description of the high quality group, where the description is obtained using a machine-learning method or system and the description distinguishes the high quality group from the low quality group, and optionally, a description of a low quality group that distinguishes it from the high quality group;
        iii) generating a Machine-Learning mode population of Machine-Learning mode solutions, where the Machine-Leaming mode solutions satisfy the description of the high quality group, and optionally, do not satisfy the description of the low quality group;
    c) repeating step b) until a predetermined Machine-Learning mode termination condition is met;
    d) repeating steps a)–c) until a predetermined LEM termination condition is met.

2. A method of claim 1, wherein the population of step (a) is generated randomly, by avoid-past-failures, by select-elite, by use-recommendations method, or some other method.

3. A method of claim 1, further comprising:
    executing a Darwinian evolution mode, comprising:
        i) generating a Darwinian evolution mode of Darwinian evolution mode solutions to the problem by applying a Darwinian evolutionary method to the starting population or the Machine-Learning mode population.

4. A method of generating solutions by learnable evolution model (LEM), comprising:

a) inputting a population of solutions to a problem;
b) executing a Machine-Learning mode and a Darwinian evolution mode,
wherein the Machine-Learning mode comprises:
i) sorting a population of solutions into at least a high quality group, medium quality (can be empty), and a low quality group, where the quality is determined by a fitness function;
ii) obtaining a description of the high quality group, where the description is obtained using a machine-learning method or system and the description distinguishes the high quality group from the low quality group;
iii) generating a new population of new solutions, where the new solutions satisfies the description of the high quality solutions; and
wherein the Darwinian evolutionary mode comprises:
i) generating a new population of new solutions to the problem by applying a Darwinian evolutionary method to the population.

5. A method of claim 4, comprising alternating between the Machine-Learning mode and Darwinian evolution mode, wherein each mode is performed repetitively, switching to the next mode when a predetermined mode termination condition is met.

6. A method of claim 4 or 5, wherein said method is initiated in the Machine-earning mode.

7. A method of claim 4 or 5, wherein said method is initiated in the Darwinian Evolution mode.

8. A method of claim 4, wherein the Darwinian evolution and Machine-Learning modes are performed repetitively until a predetermined learnable evolution model termination condition is met.

9. A method of claim 1, wherein the solutions in a) comprise continuous variables, further comprising assigning values to the variables by fixed discretization and/or adaptive anchoring discretization.

10. A method of claim 9, wherein the values are assigned by adaptive anchoring discretization.

11. A method of claim 10, wherein adaptive anchoring discretization comprises determining a consecutive order approximation.

12. A method of claim 3, wherein the solutions in a) comprise continuous variables, further comprising assigning values to the variables by fixed discretization and/or adaptive anchoring discretization.

13. A method of generating solutions by learnable evolution model (LEM), comprising:
a) inputting a starting population of starting solutions to a problem;
b) executing a Darwinian evolutionary mode, comprising:
i) generating a new population of new solutions to the problem by applying a Darwinian evolutionary method to the starting population;
c) executing a Machine-Learning mode, comprising:
i) sorting the first new population of solutions into at least a high quality group, medium quality (can be empty), and a low quality group, where the quality is determined by a fitness function;
ii) obtaining a description of the high quality group, where the description is obtained using a machine-learning method or system and the description distinguishes the high quality group from the low quality group;
iii) generating a new population of new solutions, where the new solutions satisfies the description of the high quality solutions of the current generation and some number of past generations.

14. A system for generating solutions by learnable evolution model (LEM), comprising:
a) a Darwinian evolution mode means, wherein said Darwinian evolution mode means comprises a means for generating a new population of new solutions to a problem by applying a Darwinian evolutionary method to a starting population of solutions;
b) a Machine-Learning mode means, wherein said Machine-Learning mode means comprises: a means for sorting a population of solutions into at least a high quality group, medium quality, and a low quality group, where the quality is determined by a fitness function; a means for obtaining a description of the high quality group, where the description is obtained using a machine-learning method or system and the description distinguishes the high quality group from the low quality group; and a means for generating a new population of new solutions, where the new solutions satisfies the description of the high quality solutions.

15. A system for generating solutions by learnable evolution model (LEM), comprising:
a Machine-Learning mode means, wherein said Machine-Learning mode means comprises: a means for sorting a population of solutions into at least a high quality group, medium quality, and a low quality group, where the quality is determined by a fitness function; a means for obtaining a description of the high quality group, where the description is obtained using a machine-learning method or system and the description distinguishes the high quality group from the low quality group; and a means for generating a new population of new solutions, where the new solutions satisfies the description of the high quality solutions, regenerating this method with new population generated randomly or by some method many times until the LEM termination condition is met (the best solution is satisfactory or allocated resources have been exhausted).

* * * * *